United States Patent Office 3,008,911
Patented Nov. 14, 1961

3,008,911
REACTIVE POLY(VINYL CHLORIDE) RESIN-
REACTIVE PLASTICIZER COMPOSITIONS
Stuart D. Douglas, deceased, late of Charleston, W. Va.,
by The National Bank of Commerce of Charleston,
executor, Charleston, W. Va., assignor to Union Carbide Corporation
No Drawing. Filed Sept. 30, 1958, Ser. No. 764,223
7 Claims. (Cl. 260—23)

This invention relates to improved resin compositions comprising a reactive poly(vinyl chloride) resin plasticized with a reactive epoxide plasticizer and to the cured products obtained therefrom.

Conventional plasticizers used for the commercially available vinyl resins tend to migrate and eventually are lost due to rub-off, evaporation, or by solution in solvents which come into contact with the plasticized resin composition, thus leaving the resin in a stiff and brittle condition. Some improvements have been made in overcoming these deficiencies to a slight extent, but the problem has not heretofore been satisfactorily solved.

The present invention is based on the discovery that certain reactive poly(vinyl chloride) copolymers can be plasticized with partially epoxidized reactive derivatives of long chain fatty acids and derivatives thereof to produce plasticized compositions, which can subsequently be cured to produce homogeneous and compatible compositions having the plasticizer chemically bonded to the resin. The partially epoxidized reactive compounds suitable for use as reactive plasticizers in this invention contain residual reactive double bonds capable of linking to the reactive poly(vinyl chloride) resin upon curing.

The reactive plasticizers useful in this invention are derived from the long chain fatty acids and the alkyl and alkenyl esters thereof. The fatty acid compounds suitable as starting materials can be represented by the general formula:

R—COO—R′ wherein R represents an alkyl radical or an alkenyl radical containing from about 10 to about 30 carbon atoms or more, and R′ represents a hydrogen atom, an alkyl radical containing from 1 to about 20 carbon atoms or an alkenyl radical containing from 2 to about 20 carbon atoms, preferably the R′ group contains up to about 10 carbon atoms, and wherein R′ must be an alkenyl radical containing at least two double bonds when R represents an alkyl radical. The fatty acid compounds which are used as starting materials for the production of the partially epoxidized reactive plasticizers contain at least two double bonds in the molecule, and may contain as many as five double bonds in the molecule. After partial epoxidation the plasticizers must contain at least one reactive double bond which is capable of linking to the polymer chain upon curing.

Partial epoxidation of the fatty acid compounds is controlled so as to produce an oxirane ring

at some of the double bonds, thus leaving residual reactive double bonds in the molecule which can then be linked to the polymer chain. It is to be noted that the term "alkenyl" as used in this application refers to an unsaturated alkyl radical containing from 1 to about 5 double bonds.

Illustrative of the alkyl groups which R can represent are decyl, hendecyl, dodecyl, tetradecyl, hexadecyl, eicosyl, docosyl, hexacosyl, and the like; and among the alkenyl groups which R can represent are 8-nonenyl, 1,3-nonadienyl, 8-pentadecenyl, 8-heptadecenyl, 5-heptadecenyl, 10-heptadecenyl, 8,11-heptadecadienyl, 8,11,14-heptadecatrienyl, 8,10,12-heptadecatrienyl, 8,10,12,14-heptadecatetraenyl, 8-nonadecenyl, 4,7,10,13-nonadecatetraenyl, 10-heneicosenyl, 14-tricosenyl, and the like.

Illustrative of the alkyl groups which R′ can represent are methyl, ethyl, propyl, isopropyl, t-butyl, 2-ethylhexyl, nonyl, dodecyl, octadecyl, and the like; and among the alkenyl groups which R′ can represent are ethenyl, propenyl, butenyl, hexenyl, octenyl, 2-ethylhexenyl, hendecenyl, octadecenyl, 8,11-heptadecadienyl, 8,11,14-heptadecatrienyl, 8,10,12-heptadecatrienyl, 8,10,12,14-heptadecatetraenyl, 4,7,10,13-nonadecatetraenyl, and the like.

The epoxy derivatives of the fatty acids which can be used as reactive plasticizers in this invention are the partially epoxidized unsaturated fatty acids, or the partially epoxidized alkyl esters of the unsaturated fatty acids, or the partially epoxidized alkenyl esters of the unsaturated fatty acids. Illustrative partially epoxidized fatty acid compounds are monoepoxydecyldienic acid, monoepoxylinoleic acid, monoepoxylinolenic acid, diepoxylinolenic acid, propenyl epoxygadoleic acid, vinyl epoxyoleate, butyl monoepoxylinoleate, 2-ethylhexyl epoxylinolenate, vinyl epoxyvaccenate, butenyl epoxylinolenate, epoxyethane oleate, and the like.

Also suitable as reactive plasticizers in this invention are the partially epoxidized compounds of the alkenyl esters of the saturated fatty acids. Illustrative reactive partially epoxidized compounds of this type are monoepoxybutadienyl palmitate, monoepoxyhexadienyl cerotate, diepoxyheptadecatrienyl caprate, monoepoxyheptadecadienyl stearate, and the like.

The reactive partially epoxidized unsaturated compounds suitable for use in this invention can have an oxirane oxygen content of from about 1% to about 10% by weight, or more. The purified epoxides can be used or mixtures thereof. Thus, for example, mixtures are obtained when the natural fatty acids are epoxidized with, for example, peracetic acid. Among the natural fatty acids which can be used to prepare epoxides suitable for use in this invention are lard oil, linseed oil, palm oil, olive oil, peanut oil, tung oil, castor oil, and the like. As previously indicated, all of the reactive plasticizers have at least one double bond present after partial epoxidation.

The reactive poly(vinyl chloride) copolymers useful in this invention are the fusible and soluble vinyl chloride copolymers produced by copolymerizing vinyl chloride with an oxygen-containing multi-ethylenically unsaturated monomer, such as a multi-ethylenically unsaturated mono-ether, di-ether, tri-ether, mono-ester or di-ester, or mixtures thereof. These copolymers are the subject matter of a pending patent application "Thermoset Vinyl Copolymers," Serial No. 613,814, filed October 4, 1956.

The multi-ethylenically unsaturated oxygen-containing monomers copolymerized with vinyl chloride to produce the reactive vinyl chloride copolymers are those compounds having at least one —C—O—C— linkage in the molecule. Also included among these compounds useful in this invention are those compounds which have an oxygen atom attached to one of the carbon atoms adjacent to the oxygen atom in the —C—O—C— linkage, and which are known as esters. These multi-ethylenically unsaturated oxygen containing monomers are also characterized by the presence therein of at least two ethylenic groups and no other reactive polymerizable groups.

The multi-ethylenically unsaturated oxygen-containing monomers can be mono-ethers, di-ethers, tri-ethers, mono-esters or di-esters which contain at least two ethylenic groups in the molecule. An ethylenic group is one which can be represented by the formula —CH=CH— wherein not more than one of the unsatisfied valences is substituted by a hydrogen atom. Illustrative of such compounds are allyl crotonate, crotyl crotonate, vinyl crotonate, diallyl oxalate, diallyl succinate, diallyl maleate, diallyl adipate, diallyl 3,4-epoxytetrahydrophthalate, diallyl tetrachlorophthalate, diallyl pimelate, diallyl azelate, diallyl sebacate, diallyl phthalate, dicyclopentenyl phthalate, diallyl tetrahydrophthalate, diamethallyl succinate, alpha alkenyl divinyl adipate, divinyl pimelate, 1-allyloxy-2-vinyloxyethane, 1,2-divinyloxyethane, 1,2-diallyl oxyethane, divinyl ether, diallyl ether, vinyl allyl ether, dicyclopentenyl ether, triallyl cyanurate, and the like multiethylenically unsaturated symmetrical or unsymmetrical compounds.

The reactive poly(vinyl chloride) copolymers can be produced by an organic solvent process or by aqueous emulsion or suspension process at temperatures below about 100° C. in the presence of a free radical type catalyst. In reactions below about 50° C. it is desirable to employ an activator such as, for example, sodium bisulfite, sodium sulfite, sodium hyposulfite, sodium sulfate, sulfur dioxide, and the like, to speed up the reaction. The reactive copolymers are soluble in ketones, alcoholethers, and in some aromatic hydrocarbons; for example, acetone, methyl ethyl ketone, cyclohexanone, toluene, ethylene glycol monobutyl ether, ethylene glycol ethylbutyl ether, and the like.

These reactive copolymers can be produced by reacting a mixture of vinyl chloride and oxygen-containing multiethylenically unsaturated monomer in the presence of a polymerization catalyst in an inert organic solvent at autogenous pressures at a temperature of from about 0° C. to about 90° C., preferably from about 40° C. to about 60° C. Suitable solvents are acetone, methyl ethyl ketone, cyclohexanone, toluene, and the like. The vinyl chloride content in the starting mixture can be varied from about 60 parts to about 99.5 parts, per 100 parts of monomers mixture, and the oxygen-containing multi-ethylenically unsaturated monomer content can be varied from about 0.5 part to about 40 parts when the reactive poly(vinyl chloride) copolymer is produced by the solvent process. The solvent to total monomer ratio can vary from about 70:30 to about 30:70 on a weight basis. However, when these reactive copolymers are produced by the aqueous emulsion process, the vinyl chloride content in the starting mixture can be varied from about 92 parts to about 99.9 parts per 100 parts of the monomer mixture, and the oxygen-containing multi-ethylenically unsaturated monomer content can be varied from about 0.1 part to about 8 parts by weight. In such process, the ratio of water, preferably deionized, to total monomers can be varied from about 70:30 to about 50:50 on a weight basis; and emulsifying agents at concentrations up to about 2% by weight are used. The aqueous emulsion process is carried out at autogenous pressures in a sealed vessel at temperatures of from about 10° C. to about 90° C., preferably from about 40° C. to about 60° C. in the presence of a catalyst. The copolymer is recovered by breaking the emulsion using conventional procedures and filtering and drying the precipitated copolymer.

Among the catalysts which can be used in producing the reactive poly(vinyl chloride) resins by the solvent process there can be mentioned, for example, acetyl peroxide, benzoyl peroxide, dichloroacetyl peroxide, di-t-butyl peroxide, t-butyl perbenzoate, and the like. Among the catalysts suitable in the aqueous emulsion process there are, for example, potassium persulfate, lauryl peroxide, alpha alpha′ azobisisobutyronitrile, and the like. The catalysts are generally used at concentrations of from about 0.1% to about 3% by weight of the total monomers; preferably from about 0.5% to about 1% by weight.

In addition, chain transfer agents or degraders can be added to the monomers mixture to aid in controlling the molecular weight. Suitable degraders are isobutylene, dipentene, ethylene oxide, acetaldehyde, trichloroethylene, and the like.

Suitable as emulsifying agents are surface active agents such as sodium lauryl sulfate, sodium dioctyl sulfosuccinate, sodium 1-isobutyl-4-ethyloctyl sulfate, and the like. Ordinarily these are employed at concentrations of from about 0.1% to about 2% by weight based on the weight of the monomer mixture.

The improved plasticized compositions of this invention contain from about 50 to about 99 parts, preferably from about 70 to 80 parts, of reactive poly(vinyl chloride) resin in admixture with from about 1 to about 50 parts, preferably from about 20 to about 30 parts, of reactive epoxide plasticizers, per 100 parts by weight of plasticized resin composition. In addition, the plasticized resin composition can contain conventional unreactive plasticizers such as dioctyl phthalate and the like; however, the total plasticizer content should be kept within the above limits.

The reactive epoxide plasticizer is added to the reactive poly(vinyl chloride) resin by conventional procedures preferably at temperatures below about 100° C. and the two are processed, for example, on a hot two-roll mill below about 100° C., until the fluxed sheet is homogeneous. Then a cure catalyst is added at a temperature below the activation temperature of the cure catalyst, preferably below about 100° C., and fluxing is continued until the catalyst is evenly distributed in the plasticized resin composition.

Among the cure catalysts which can be used to cure the plasticized composition are the organic peroxides, such as chlorobenzoyl peroxide, lauroyl peroxide, di-t-butyl peroxide, stearoyl peroxide, t-butyl perbenzoate, and the like; or mixtures of peroxides with other compounds, for example, a mixture of a mineral spirits solution of a zirconium-organo complex (technically known as Zirco drier) and a rare earth metallic naphthenate (mainly lanthanum and cerium; technically known as Soligen rare earth) with t-butyl perbenzoate, or a mixture of cobalt octoate with t-butyl perbenzoate. The concentration of cure catalyst can be varied from about 1 part to about 8 parts, preferably from about 2 parts to about 3 parts, per 100 parts of plasticized poly(vinyl chloride) resin composition.

The catalyzed composition can be used in solution for coating wire, or other flat or shaped articles; the solutions can also be used in dip- and spray-coating applications. The dry catalyzed composition can be milled and molded, or extruded or shaped by conventional processes well known in the art, and can be used, for example, to manufacture floor tiles.

The catalyzed reactive epoxide plasticizer-reactive poly(vinyl chloride) resin composition can be cured to insoluble and infusible form by heating at from about 100° C. to about 200° C. or higher for from about 3 minutes to about 40 minutes. The curing cycle is, of course, dependent on the conditions of time, temperature, pressure and catalyst concentration employed. Preferably conditions are chosen so that the plasticized copolymer is completely cured in about 10 minutes at about 150° C.

The plasticized resin compositions can contain any of the additives normally present in resin compositions, such as lubricants, anti-oxidants, stabilizers, fillers, pigments and other coloring matters, carbon black, etc.

The following examples further serve to illustrate this invention. Parts are by weight unless otherwise specified.

*Example 1*

Seventy parts of a reactive resin produced by reacting vinyl chloride and vinyl crotonate by the solvent process, and containing 91.6% vinyl chloride and 8.4% vinyl crotonate, was milled for 10 minutes at 60° C. with 30 parts of a reactive partially epoxidized linseed oil containing 4.28% oxirane oxygen. A catalyst composition consisting of 2 parts of t-butyl perbenzoate, 1.25 parts of lead octoate and 0.5 part of cobalt octoate, per 100 parts by weight of reactive resin plus reactive plasticizer, was added to the mixture, and the composition was milled at about 60° C. until the catalyst was dispersed therethrough. An infusible and insoluble plaque molded therefrom at 150° C. and at a pressure of 1500 p.s.i.g. for 10 minutes had the following properties:

| | |
|---|---|
| Tensile, p.s.i. | 1125 |
| Elongation, percent | 75 |
| A.S.T.M. stiffness modulus, p.s.i. | 1460 |
| $T_f$, ° C. | −13 |
| $T_4$, ° C. | 11 |
| $T_b$, ° C. | 26 |
| Hardness, durometer A | 74 |

Articles molded from the same composition but without added catalyst so that there would be less interaction between reactive resin and reactive plasticizer during the molding step showed inferior properties as shown below:

| | |
|---|---|
| Tensile, p.s.i. | 800 |
| Elongation, percent | 65 |
| A.S.T.M. stiffness modulus, p.s.i. | 1135 |
| $T_f$, ° C. | −15 |
| $T_4$, ° C. | 10 |
| $T_b$, ° C. | 30 |
| Hardness, durometer A | 69 |

In similar manner, as described in Example 1, plasticized resin compositions were produced using the reactive resins, reactive plasticizers, and catalyst compositions shown in the table. For convenience these have been tabulated below. The oxirane oxygen content of the epoxidized reactive plasticizers used was 3.14% by weight in Examples 2, 3 and 4; 4.28% by weight in Examples 5, 6, 7 and 8; 6.3% by weight in Example 9; 6.8% by weight in Examples 10 and 11; and 3.3% by weight in Example 12. All of the plasticized resin compositions cured to transparent flexible products when molded under the conditions indicated.

In all instances the physical properties of the molded articles were determined as follows:

Tensile, elongation and load were obtained using a Scott L–6 tensile tester operating at a constant rate of elongation of 4 feet per minute with a variable rate of loading.
Stiffness modulus—A.S.T.M. D747–50.
$T_4$ and $T_f$—A.S.T.M. D1043–51.
$T_b$—A.S.T.M. D746–55T.
Hardness, durometer A—A.S.T.M. D676–42T.

What is claimed is:
1. A poly(vinyl chloride) resin composition plasticized with a reactive partially epoxidized plasticizer having an oxirane oxygen content of from about 1% to about 10% by weight; said poly(vinyl chloride) resin consisting of the copolymerization product of from about 60 to about 99.5 parts by weight of vinyl chloride with from about 0.5 to about 40 parts by weight of an oxygen-containing multi-ethylenically unsaturated monomer selected from the group consisting of mono-ethers, di-ethers said oxygen-containing multi-ethylenically unsaturated monomer characterized by the presence therein of at least two ethylenic groups and no other reactive polymerizable groups, tri-ethers, mono-esters and di-esters, and said reactive partially epoxidized plasticizer selected from the group consisting of partially epoxidized unsaturated fatty acids, alkyl esters of partially epoxidized unsaturated fatty acids, partially epoxidized alkenyl esters of unsaturated fatty acids and partially epoxidized alkenyl esters of saturated fatty acids, said fatty acids having from about 10 to about 30 carbon atoms, said alkyl radicals having from 1 to about 20 carbon atoms, and said alkenyl radicals having from 2 to about 20 carbon atoms, said reactive partially epoxidized plasticizer containing residual reactive double bonds.

2. A poly(vinyl chloride) resin composition comprising from about 50 to about 99 parts by weight of a reactive poly(vinyl chloride) resin plasticized with from about 1 to about 50 parts by weight of a reactive partially epoxidized plasticizer having an oxirane oxygen content of from about 1% to about 10% by weight; said reactive poly(vinyl chloride) resin consisting of the copolymerization product of from about 60 to about 99.5 parts by weight of vinyl chloride with from about 0.5 to about 40 parts by weight of an oxygen-containing multi-ethylenically unsaturated monomer selected from the group consisting of mono-ethers, di-ethers, tri-ethers, mono-esters and di-esters, said oxygen-containing multi-ethylenically unsaturated monomer characterized by the presence therein of at least two ethylenic groups and no other reactive polymerizable groups, and said reactive partially epoxidized plasticizer selected from the group consisting of partially epoxidized unsaturated fatty acids, alkyl esters of partially epoxidized unsaturated fatty acids, partially epoxidized alkenyl esters of unsaturated fatty acids and partially epoxidized alkenyl esters of saturated fatty acids, said fatty acids having from about 10 to about 30 carbon atoms, said alkyl radicals having from 1 to about 20 carbon atoms, and said alkenyl radicals having from 2 to

| Example | 2 | 3 | 4 | 5 | 6 | 7 | 8 | 9 | 10 | 11 | 12 |
|---|---|---|---|---|---|---|---|---|---|---|---|
| Reactive Poly(vinyl chloride) copolymer, pts. | 70 | 70 | 70 | 70 | 70 | 70 | 70 | 70 | 70 | 70 | 70 |
| Vinyl Chloride, percent | 86.9 | 86.9 | 86.9 | 86.9 | 86.9 | 86.9 | 86.9 | 87.9 | 86.9 | 86.9 | 86.9 |
| Comonomer, percent, diallyl succinate | 13.1 | 13.1 | 13.1 | 13.1 | 13.1 | 13.1 | 13.1 | 12.1 | 13.1 | 13.1 | 13.1 |
| Reactive Plasticizer, pts.: | | | | | | | | | | | |
| Epoxidized linseed oil | 30 | 30 | 30 | 30 | 30 | 30 | 30 | | | | |
| Epoxidized soy bean oil | | | | | | | | 30 | | | |
| Epoxidized methacrylate ester of reduced linseed oil | | | | | | | | | 30 | 30 | |
| Epoxidized methacrylate ester of lard oil | | | | | | | | | | | 30 |
| Milling Conditions: | | | | | | | | | | | |
| Minutes | 10 | 10 | 10 | 15 | 15 | 10 | 10 | 10 | 10 | 15 | 15 |
| Temp., ° C. | 60–70 | 60–70 | 60–70 | 40–90 | 40–90 | 50–70 | 50–70 | 80–150 | 30–80 | 55–65 | 40–50 |
| Molding Conditions: | | | | | | | | | | | |
| Minutes | 10 | 10 | 30 | 10 | 10 | 30 | 10 | 10 | 10 | 10 | 10 |
| Temp., ° C. | 150 | 150 | 110 | 150 | 150 | 110 | 150 | 160 | 150 | 150 | 150 |
| Catalyst | (ᵃ) | (ᵃ) | (ᵇ) | (ᵇ) | (ᵃ) | (ᵇ) | (ᵇ) | (ᵇ) | (ᵃ) | (ᵃ) | (ᵃ) |
| Tensile, p.s.i. | 1,050 | 1,200 | 875 | 925 | 1,200 | 800 | 1,000 | 925 | 1,900 | 2,800 | 3,050 |
| Elongation, percent | 140 | 175 | 110 | 130 | 90 | 125 | 125 | 60 | 25 | 10 | 0 |
| Load at 100% elongation, p.s.i. | 925 | 950 | 870 | 800 | 700 | 700 | 920 | | | | |
| $T_f$, ° C. | −30 | −22 | | −20 | | −21 | | −15 | 3 | 12 | 19 |
| $T_4$, ° C. | 8 | 8 | | 3 | | 1 | | 7 | 28 | 33 | 43 |
| $T_b$, ° C. | −6 | 0 | 12 | 6 | 12 | 12 | 6 | 22 | 26 | 18 | 28 |
| Hardness, Durometer A | 72 | 68 | 69 | 58 | 63 | 57 | 62 | 75 | 92 | 91 | 97 |
| Stiffness, p.s.i. | 14,600 | 10,950 | 10,700 | 5,560 | 530 | 4,310 | 5,000 | 760 | 10,440 | 22,800 | 60,000 |

ᵃ 2% t-butyl perbenzoate, 1% Soligen rare earth, 0.2% Zirco drier.
ᵇ 1% p-chlorobenzoyl peroxide.

about 20 carbon atoms; said reactive partially expoxidized plasticizer containing residual reactive double bonds.

3. A poly(vinyl chloride) resin composition comprising from about 70 to about 80 parts by weight of a reactive poly(vinyl chloride) resin plasticized with from about 20 to about 30 parts by weight of a reactive partially epoxidized plasticizer having an oxirane oxygen content of from about 1% to about 10% by weight; said reactive poly(vinyl chloride) resin consisting of the copolymerization product of from about 60 to about 99.5 parts by weight of vinyl chloride with from about 0.5 to about 40 parts by weight of an oxygen-containing multi-ethylenically unsaturated monomer selected from the group consisting of mono-ethers, di-ethers said oxygen-containing multi-ethylenically unsaturated monomer characterized by the presence therein of at least two ethylenic groups and no other reactive polymerizable groups, tri-ethers, mono-esters and di-esters, and said reactive partially epoxidized plasticizer selected from the group consisting of partially epoxidized unsaturated fatty acids, alkyl esters of partially epoxidized unsaturated fatty acids, partially epoxidized alkenyl esters of unsaturated fatty acids and partially epoxidized alkenyl esters of saturated fatty acids, said fatty acids having from about 10 to about 30 carbon atoms, said alkyl radicals having from 1 to about 20 carbon atoms, and said alkenyl radicals having from 2 to about 20 carbon atoms; said reactive partially epoxidized plasticizer containing residual reactive double bonds.

4. A poly(vinyl chloride) resin composition comprising from about 50 to about 99 parts by weight of a reactive poly(vinyl chloride) resin plasticized with from about 1 to about 50 parts by weight of partially epoxidized linseed oil having an oxirane oxygen content of from about 1% to about 10% by weight; said reactive resin consisting of the copolymerization product of from about 60 to about 99.5 parts by weight of vinyl chloride with from about 0.5 to about 40 parts by weight of vinyl crotonate.

5. A poly(vinyl chloride) resin composition comprising from about 50 to about 99 parts by weight of a reactive poly(vinyl chloride) resin plasticized with from about 1 to about 50 parts by weight of partially epoxidized soy bean oil having an oxirane oxygen content of from about 1% to about 10% by weight; said reactive resin consisting of the copolymerization product of from about 60 to about 99.5 parts by weight of vinyl chloride with from about 0.5 to about 40 parts by weight of diallyl succinate.

6. A poly(vinyl chloride) resin composition comprising from about 50 to about 99 parts by weight of a reactive poly(vinyl chloride) resin plasticized with from about 1 to about 50 parts by weight of partially epoxidized methacrylate ester of reduced linseed oil having an oxirane oxygen content of from about 1% to about 10% by weight; said reactive resin consisting of the copolymerization product of from about 60 to about 99.5 parts by weight of vinyl chloride with from about 0.5 to about 40 parts by weight of diallyl succinate.

7. A poly(vinyl chloride) resin composition comprising from about 50 to about 99 parts by weight of a reactive poly(vinyl chloride) resin plasticized with from about 1 to about 50 parts by weight of partially epoxidized methacrylate ester of lard oil having an oxirane oxygen content of from about 1% to about 10% by weight; said reactive resin consisting of the copolymerization product of from about 60 to about 99.5 parts by weight of vinyl chloride with from about 0.5 to about 40 parts by weight of diallyl succinate.

References Cited in the file of this patent

UNITED STATES PATENTS

| | | |
|---|---|---|
| 2,202,846 | Garvey et al. | June 4, 1940 |
| 2,485,270 | Folt | Oct. 18, 1949 |
| 2,496,384 | De Nie | Feb. 7, 1950 |
| 2,810,733 | Greenspan | Oct. 22, 1957 |
| 2,826,562 | Shokal | Mar. 11, 1958 |
| 2,857,349 | Greenspan et al. | Oct. 21, 1958 |

UNITED STATES PATENT OFFICE
CERTIFICATION OF CORRECTION

Patent No. 3,008,911                                   November 14, 1961

Stuart D. Douglas, deceased, by the National Bank of Commerce of Charleston, executor It is hereby certified that error appears in the above numbered patent requiring correction and that the said Letters Patent should read as corrected below.

Column 6, line 14, strike out ", tri-ethers, mono-esters and di-esters," and insert the same after "di-ethers" in line 10; column 7, lines 17 and 18, strike out ", tri-ethers, mono-esters and di-esters," and insert the same after "di-ethers" in line 14.

Signed and sealed this 17th day of April 1962.

(SEAL)
Attest:

ESTON G. JOHNSON                                     DAVID L. LADD
Attesting Officer                                         Commissioner of Patents